United States Patent
Corder

(10) Patent No.: US 9,573,086 B2
(45) Date of Patent: Feb. 21, 2017

(54) DRAIN COVER

(71) Applicant: Micah Corder, Ashburn, VA (US)

(72) Inventor: Micah Corder, Ashburn, VA (US)

( * ) Notice: Subject to any disclaimer, the term of this patent is extended or adjusted under 35 U.S.C. 154(b) by 150 days.

(21) Appl. No.: 14/531,433

(22) Filed: Nov. 3, 2014

(65) Prior Publication Data
US 2016/0122995 A1    May 5, 2016

(51) Int. Cl.
| | | |
|---|---|---|
| *E03F 5/06* | (2006.01) | |
| *B01D 35/02* | (2006.01) | |
| *E03F 5/04* | (2006.01) | |

(52) U.S. Cl.
CPC .............. *B01D 35/02* (2013.01); *E03F 5/041* (2013.01); *E03F 5/0404* (2013.01); *E03F 5/0407* (2013.01); *E03F 5/06* (2013.01)

(58) Field of Classification Search
CPC .............. E03F 5/04; E03F 5/0407; E03F 5/06; E03F 5/14; B01D 29/0004; B01D 29/0095; B01D 29/03; B01D 35/02; E03C 1/26
USPC ....... 210/747.3, 163, 164, 165, 170.03, 498; 4/286, 292; 52/302.1
See application file for complete search history.

(56) References Cited

U.S. PATENT DOCUMENTS

| | | | |
|---|---|---|---|
| 1,375,222 A | 4/1921 | Lutz | |
| 2,695,677 A | 11/1954 | Sisk | |
| 2,777,532 A | 1/1957 | Sisk | |
| 2,783,852 A | 3/1957 | Sisk | |
| D183,574 S | 9/1958 | Liskey, Jr. | |
| 3,040,895 A | 6/1962 | Sisk | |
| 3,212,416 A * | 10/1965 | Boersma | E03F 5/06 210/163 |
| 3,246,582 A | 4/1966 | Wade et al. | |
| 3,406,829 A | 10/1968 | Vande Bosche | |
| 3,742,525 A | 7/1973 | Oropallo | |
| D229,080 S | 11/1973 | Mihm | |
| 3,788,485 A * | 1/1974 | Bruning | E03C 1/264 4/286 |
| 4,146,939 A | 4/1979 | Izzi | |
| 4,471,497 A | 9/1984 | Riutort et al. | |
| 4,596,729 A | 6/1986 | Morrison | |

(Continued)

FOREIGN PATENT DOCUMENTS

| | | |
|---|---|---|
| EP | 0982448 A1 | 3/2000 |
| EP | 1905907 B1 | 11/2011 |

OTHER PUBLICATIONS drinkstuff.com, Product Image of Anti-Skid Tray Mat to fit 14 inch Waiters Tray, URL: http://www.drinkstuff.com/productimg/57481_large.jpg, Retrieved from the Internet on Oct. 29, 2013, 1 page.

(Continued)

*Primary Examiner* — Christopher Upton
(74) *Attorney, Agent, or Firm* — Birch, Stewart, Kolasch & Birch, LLP

(57) ABSTRACT

An areaway drain cover with a top surface, a bottom surface, and a peripheral edge surface with a plurality of passages passing from the top surface to the bottom surface which allow water to pass through the passages while preventing leaves and debris from clogging the drain. The bottom surface also comprises a plurality of protrusions projecting downwardly from the bottom surface so that when the drain cover is placed over a drain, the protrusions allow the drain cover to be spaced horizontally above the surface on which the drain cover is resting so as to allow water to pass.

20 Claims, 3 Drawing Sheets

(56) References Cited

U.S. PATENT DOCUMENTS

| | | | | |
|---|---|---|---|---|
| 4,655,913 A * | 4/1987 | Boersma | ............... | E03C 1/264 |
| | | | | 210/163 |
| D301,530 S | 6/1989 | Jonker | | |
| 4,910,811 A | 3/1990 | Izzi, Sr. | | |
| 5,372,715 A | 12/1994 | Maggard et al. | | |
| 5,376,264 A | 12/1994 | Betancourt | | |
| 5,409,602 A * | 4/1995 | Sorenson | ............... | B01D 35/02 |
| | | | | 210/163 |
| D370,716 S | 6/1996 | Menzies | | |
| D428,120 S | 7/2000 | Zaldivar | | |
| 6,233,776 B1 | 5/2001 | Blum et al. | | |
| 6,338,168 B1 * | 1/2002 | Valentine | ............... | A47K 1/14 |
| | | | | 4/286 |
| 6,799,606 B1 | 10/2004 | Howson | | |
| D562,995 S | 2/2008 | Diamond et al. | | |
| D564,636 S | 3/2008 | Hanna | | |
| D574,066 S | 7/2008 | Hanna | | |
| D587,346 S | 2/2009 | Diamond et al. | | |
| D590,219 S | 4/2009 | Jabs | | |
| 7,575,795 B2 | 8/2009 | Scott et al. | | |
| 7,575,796 B2 | 8/2009 | Scott et al. | | |
| D614,267 S | 4/2010 | Breda | | |
| D614,268 S | 4/2010 | Breda | | |
| 7,698,859 B2 | 4/2010 | Sansano Marti | | |
| D629,875 S | 12/2010 | Sears | | |
| 7,862,729 B2 | 1/2011 | Stetson | | |
| 8,043,498 B2 | 10/2011 | Rueda | | |
| D654,748 S | 2/2012 | Lu | | |
| 8,241,726 B2 | 8/2012 | Scott et al. | | |
| D666,447 S | 9/2012 | Zemel et al. | | |
| D672,439 S | 12/2012 | Heiser et al. | | |
| 8,337,694 B1 | 12/2012 | Sykes et al. | | |
| D687,524 S | 8/2013 | Heiser | | |
| D687,526 S | 8/2013 | Heiser | | |
| D687,527 S | 8/2013 | Heiser et al. | | |
| 8,557,109 B1 * | 10/2013 | Sutherland | ............ | E03F 5/0404 |
| | | | | 210/163 |
| 2008/0277324 A1 | 11/2008 | Meyers | | |
| 2010/0288685 A1 | 11/2010 | Meyers | | |
| 2013/0264256 A1 | 10/2013 | Hebert | | |
| 2014/0352815 A1 * | 12/2014 | Brodey | ............... | E03F 5/0407 |
| | | | | 137/544 |

OTHER PUBLICATIONS

Floor Mat Company, "'Diamond Plate' Roll Rubber Matting" Product Description, URL: http://www.floormatcompany.com/rubber-floor-mats/textured-mats/diamond-plate-roll-rubber-matting.html, Retrieved from the Internet on Jul. 24, 2014, 2 pages.

klaremont.com, Product Image, URL: http://www.klaremont.com/images/ProductCategories/BA702000.JPG, Retrieved from the Internet on Oct. 29, 2013, 1 page.

Material Handling Solutions, "Rubber Mats", Product Description, Url: http://industrial-commercial-mats.e-rackonline.com/rubber-mats/, Retrieved from the Internet on Jul. 24, 2014, 3 pages.

newpig.com.au (IQ Safety—Intelligent Spill Management), Product Image for PIG Poly Drip Deck, URL: http://www.newpig.com.au/images/PAK566_1.jpg, Retrieved from the Internet on Oct. 29, 2013, 1 page.

rubbercal.com, "Dura-Chef 1/2-inch Rubber Comfort Mats," URL: http://www.rubberflooringexperts.com/rubber-floors/rubber-mats/dura-chef-1-2-inch-rubber-comfort-mats.html, First Retrieved from the Internet Nov. 2013 (reprinted Mar. 2, 2015), 4 pages.

Slip-X Solutions, "Deluxe Square Shower Mat," Product Description (Blue), URL: http://www.amazon.com/Deluxe-Essential-Square-Shower-Mat/dp/B003RQXOXO/ref=pd . . . , Retrieved from the Internet on Jan. 24, 2014, 5 pages.

Slip-X Solutions, "Deluxe Square Shower Mat," Product Description (White), URL: http://www.amazon.com/Deluxe-Essential-Square-Shower-Mat/dp/B003RQXOXO/ref=pd . . . , Retrieved from the Internet on Jan. 24, 2014, 5 pages.

Slip-X Solutions, "Essential Round Shower Mat," Product Description, URL: http://www.amazon.com/Slip-X-Solutions-070631054000-Essential-Shower/dp/B001BVK . . . , Retrieved from the Internet on Jan. 24, 2014, 5 pages.

Slip-X Solutions, "Extra Long Vinyl Bath Mat," Product Description, URL: http://www.amazon.com/Extra-Long-Vinyl-Bath-Mat/dp/B001BVQJ7A, Retrieved from the Internet on Jan. 24, 2014, 5 pages.

Slip-X Solutions, "Round Shower Mat," Product Description, URL: http://www.slipxsolutions.com/round-shower-mat?utm_source=PriceGrabber&utm_mediu . . . , Retrieved from the Internet on Jan. 24, 2014, 1 page.

Wikipedia, "Rubber Mat," Definition from Wikipedia, the Free Encyclopedia, URL: http://en.wikipedia.org/wiki/Rubber_mat, Retrieved from the Internet on Jul. 24, 2014, 3 pages.

* cited by examiner

DRAIN COVER

FIELD OF THE INVENTION

The present invention relates to drain covers that prevent leaves and other debris from entering into and clogging a drain, while simultaneously allowing water to pass through the drain cover into the drain.

BACKGROUND OF THE INVENTION

Areaway drains can get clogged with leaves, debris, and other items that prevent water from draining effectively. This can cause the water level to rise, eventually entering the house through the back door, basement or below grade. The prior art discloses drain covers that can prevent leaves and debris from clogging drains, but these drain covers must be checked and cleaned every time it rains to prevent the drains from clogging.

Some known drain covers are made of heavy and bulky products like metal, which can make them heavy and difficult to transport. For example, the drain cover disclosed in U.S. Pat. No. 8,337,694 necessarily includes a handle to facilitate transport of the drain cover. Also, many known drain covers, like the ones disclosed in U.S. Pat. No. 8,337,694 and U.S. patent application Ser. No. 13/828,389 are elevated off the ground, which may cause a person to trip while walking by or over the drain cover.

The storm drain cover disclosed in U.S. Pat. No. 8,043,498 contains projections extending upward from the top surface of the drain cover, impeding the passage of debris. This causes the drain cover to collect debris within the bumpy top surface, which is therefore difficult to clean. It is difficult to clean this drain cover, especially while in place over a storm drain, because the projections on the top surface hold the debris, making it difficult to remove collected debris, such as leaves, by sweeping.

SUMMARY OF THE INVENTION

The present invention relates to a drain cover. More specifically, the invention provides a plastic or rubber drain cover that can be used in areaways.

It is an object of the present invention to provide a new and improved drain cover that prevents leaves and other debris from clogging drains and also can eliminate some of the disadvantages of drain covers disclosed in the prior art.

It is another object of the present invention to provide a drain cover that is not heavy and bulky, and is therefore easily transported.

Another object of the present invention is to provide a drain cover that does not need to be removed from the drain area in order to be cleaned. For example, because the drain cover does not have projections on its top surface, debris such as leaves can be swept off the cover while the cover is in place over a drain.

Yet another object of the present invention is to provide a drain cover that has a top surface that is only minimally elevated off the ground and contains tapered edges, therefore reducing the likelihood of a person tripping while walking over or around the drain cover.

Another object of the present invention is to provide a drain cover that is made of a material strong enough to withstand the weight of a person walking over it, even when placed over a non-planar surface such as the surface of a stairwell that is sloped to allow drainage of water to a drain, and flexible enough not to easily crack or break when a person steps on it when in place over a stairwell drain.

Yet another object of the present invention is to provide a drain cover that contains holes in the drain cover and protrusions on the bottom surface, allowing water to more easily pass through the drain cover and into the drain while still effectively blocking leaves and other debris from entering the drain. This reduces the need to frequently clean the drain cover.

The present invention comprises:

1. A single piece molded drain cover having a generally planar top surface having a first surface area, a bottom surface parallel to said top surface having a second surface area which is larger than said first surface area and having a shape the same as said top surface and a peripheral edge surface connecting said top surface with said bottom surface, said drain cover further comprising a plurality of passages passing from said top surface to said bottom surface which allow water to pass through said passages, said lower surface further comprising a plurality of protrusions projecting downwardly from said bottom surface so that when said drain cover is placed over a drain, the portion of said bottom surface containing said protrusions is spaced horizontally above a surface on which said drain cover is resting so as to allow water to flow through said plurality of passages and then between said protrusions towards said drain.

2. The drain cover according to paragraph 1, wherein said peripheral edge surface is angled between 30 and 60 degrees relative to horizontal.

3. The drain cover according to paragraph 1, which has a circular shape when viewed from the top.

4. The drain cover according to paragraph 3, wherein said drain cover has a diameter of about 18 to 30 inches.

5. The drain cover according to paragraph 1, wherein said plurality of protrusions protrude downwardly from said lower surface at least 0.25 inch.

6. The drain cover according to paragraph 1, wherein said plastic material is a non-absorbent, non-porous plastic or rubber material.

7. The drain cover according to paragraph 1, wherein said material is sufficiently rigid so that when placed on a flat surface said drain cover does not sag between said plurality of protrusions to an extent whereby said drain cover touches the surface on which said drain cover is resting and wherein said material also has flexibility so that said material will deform under its own weight when placed on an uneven surface.

8. The drain cover according to paragraph 1, wherein said plurality of passages are circular in shape when viewed from the top.

9. The drain cover according to paragraph 1, wherein said plurality of passages are arranged in a regular pattern over at least 50% of said first surface area of said top surface.

10. The drain cover according to paragraph 1, wherein said plurality of passages are arranged in a regular pattern over at least 80% of said first surface area of said top surface.

11. The drain cover according to paragraph 1, wherein said peripheral edge surface is in a shape of a truncated cone.

12. The drain cover according to paragraph 1, wherein some of said plurality of projections are located on a peripheral area of said bottom surface whereby said peripheral edge is spaced horizontally above said surface on which said drain cover is resting so as to allow water to pass under said peripheral edge surface.

13. The drain cover according to paragraph 1, wherein said passages and said protrusions are arranged in a regular pattern and there is a 1:1 correspondence between the number of passages and the number of protrusions throughout said bottom surface of said drain cover except that there are additional protrusions on said bottom surface of said drain cover around a peripheral portion of said bottom surface of said drain cover.

14. A method for reducing the clogging of a stairwell drain by leaves, comprising the step of:

placing over a stairwell drain a single piece molded drain cover to reduce clogging in an exterior stairwell having a top surface, a bottom surface parallel to said top surface and a peripheral edge surface, said drain cover further comprising a plurality of passages passing from said top surface to said bottom surface for allowing water to pass through said passages, said lower surface further comprising a plurality of protrusions projecting downwardly from said bottom surface so that when said drain cover is placed over a drain, the portion of said bottom surface containing said protrusions is spaced horizontally above a surface on which said drain cover is resting so as to allow water to flow through said plurality of passages and then between said protrusions towards said drain.

15. In combination, an exterior stairwell drain and a single piece molded drain cover placed over said stairwell drain, said plastic drain cover having a top surface, a bottom surface parallel to said top surface and a peripheral edge surface, said drain cover further comprising a plurality of passages passing from said top surface to said bottom surface for allowing water to pass through said passages, said lower surface further comprising a plurality of protrusions projecting downwardly from said bottom surface so that when said drain cover is placed over said drain, wherein the portion of said bottom surface containing said protrusions is spaced horizontally above a surface on which said drain cover is resting so as to allow water to flow through said plurality of passages and then between said protrusions towards said drain.

16. A packaged drain cover comprising a drain cover described in paragraph 1 and packaging physically associated with said drain cover with instruction that said drain cover should be placed over a drain.

DETAILED DESCRIPTION OF THE INVENTION

Figure 1:
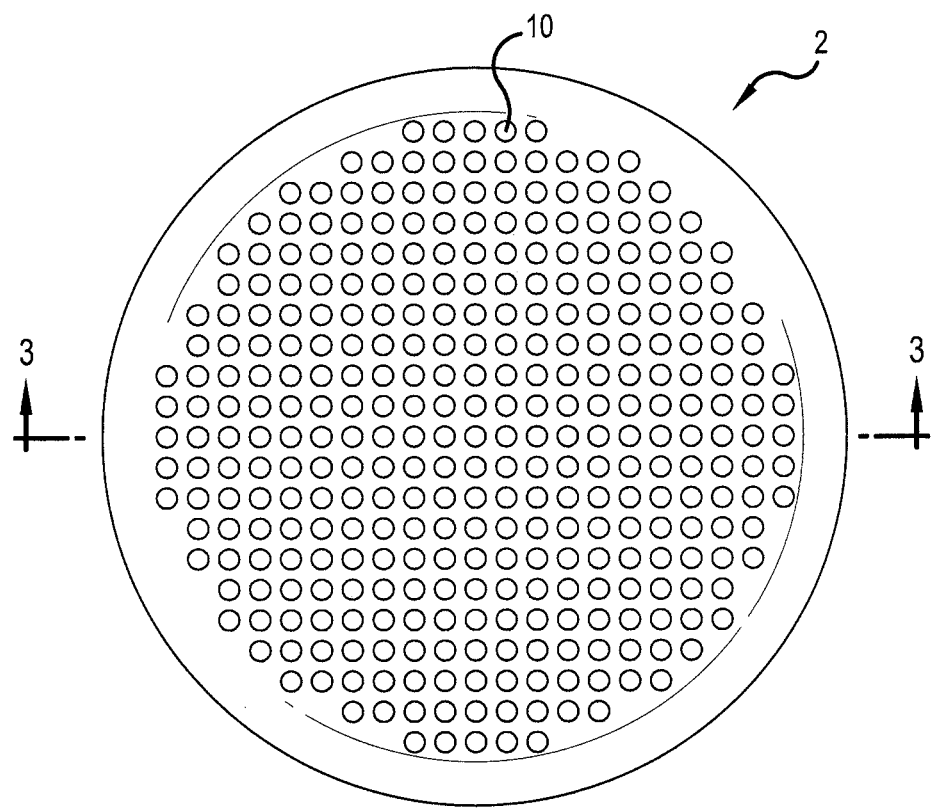
FIG. 1 is a top view of a preferred embodiment of the drain cover of the present invention.

The present invention relates to a plastic or rubber drain mat that covers the opening of a drain and simultaneously allows water to drain. One embodiment of the present invention can be tapered on the edges so the drain cover is not a trip hazard. Another embodiment of the present invention contains bumps on the bottom of the drain cover so that all or the majority of the bottom surface of the drain cover is raised off the ground to allow water to flow under the drain cover. This solves the problem of easy clogging, and instead of a small amount of debris clogging the drain, it would take a huge amount of leaves or debris to prevent water from draining.

A further embodiment contains holes in the drain cover that allow water to drain through the drain cover. An even further embodiment involves a drain cover made out of a flexible material that allows the drain cover to partially or fully contour with the drain area, while maintaining enough strength to withstand the weight of a person walking over the drain cover. Another embodiment involves a drain cover with a top surface having no projections (preferably flat and smooth) that is easily cleaned without needing to first remove the drain cover.

Overall Shape of the Drain Cover

Preferably, the present invention has a circular or oval shape when viewed from the top. Other embodiments of the invention may have a square or rectangular shape when viewed from the top. Further embodiments may have other polygonal shapes, like pentagonal, hexagonal or octagonal when viewed from the top.

The top surface of the drain cover preferably has a smaller surface area than the surface area of the bottom surface, thereby allowing for a sloped peripheral edge connecting to the top and bottom surfaces. Preferably, the peripheral edge surface (or surfaces, if the drain cover has a polygonal shape) connects the bottom surface and the top surface to one another.

The peripheral edge surface is preferably tapered at an angle of less than 90 degrees relative to the bottom surface of the drain cover to create a "non-trip" edge and decrease the likelihood that the drain cover will break if a heavy object is rolled over the drain cover. The angle from the bottom surface to the peripheral edge surface of the drain cover is preferably 60 degrees or less (e.g., 10-60 degrees), more preferably 45 degrees or less (e.g., 20-45 degrees), and most preferably approximately 30 degrees (e.g., 25 to 35 degrees).

Size of the Drain Cover

The drain cover is preferably of a size sufficient to cover a significant part of the sloped part of the drain area. More preferably, the invention extends beyond a recessed drain (usually having a diameter of about 4-6") on all sides by at least 6 inches, preferably more. Even more preferably, the drain cover has a diameter of 12 to 36 inches, more preferably 18 to 30 inches, most preferably 24 inches.

Preferably, the drain cover has a strength sufficient to withstand a person walking across the drain cover. More preferably, the drain cover has a thickness of 0.5 to 2 inches or 1 to 2 inches from the top surface to the bottom of the protrusions located on the bottom surface. Even more preferably, the drain cover has a thickness of 1.0 to 1.5 inches from the top surface to the bottom of the protrusions located on the bottom surface.

Size, Shape, Distribution and Number of the Passages

The present invention includes a number of individual passages (holes) allowing water to pass through the drain cover and into the drain. The passages are preferably arranged in a regular pattern over substantially the entire upper surface, but not in the sloped edges. Preferably, the drain cover contains passages that make up at least 10% of the top surface area, more preferably at least 20% of the top surface area, and even more preferably at least 25% of the top surface area and preferably not more than 90% of the top surface area, more preferably not more than 80% of the top surface area, and even more preferably not more than 70% of the top surface area.

The present invention preferably contains at least 10 holes, more preferably at least 100 holes, and even more preferably at least 200 holes and preferably not more than 700 holes, more preferably not more than 600 holes, and even more preferably not more than 500 holes. In a preferred embodiment, the drain cover contains 270-400 holes.

Preferably, each of the holes in the drain cover has a diameter of approximately 0.25 to 1.0 inch. Even more preferably, each of the holes in the drain cover has a diameter of approximately 0.5 inch.

Size, Shape, Distribution and Number of Protrusions on Bottom Surface

Preferably, the protrusions are arranged in a regular pattern which is the same pattern as the passages in the drain cover. The present invention may include a number of protrusions on the bottom surface of the drain cover. Preferably, there is approximately a 1:1 ratio (a 1:1 ratio±30%) between the number of protrusions and the number of passages in the present invention. More preferably, there is one protrusion spaced equidistant from four adjacent passages and there are also additional protrusions arranged on the bottom surface of the drain cover in a peripheral area which does not contain passages. In another embodiment, the peripheral area on the bottom surface can be devoid of protrusions thereby allowing the peripheral edge of the drain cover to possibly contact the surface on which it is resting (because the surface on which the drain cover is resting will typically be sloped towards the underlying drain, and/or because the peripheral edge may sag (deform) slightly under its own weight) whereby the peripheral edge of the drain cover will be flush with the surface on which it is resting. In this embodiment, very little water would run under the peripheral edge of the drain cover, but water could still easily flow across or accumulate on the top of the drain cover and pass through the holes. In a preferred embodiment there will be more than one protrusion per hole, with a preferred ratio of protrusions to holes being 1.01 to 1.4, preferably 1.01 to 1.3. Preferably, the drain cover contains protrusions that make up at least 5% of the surface area of the bottom surface, more preferably at least 10% of the surface area of the bottom surface, and even more preferably at least 15% of the surface area of the bottom surface and preferably not more than 80% of the surface area of the bottom surface, more preferably not more than 60% of the surface area of the bottom surface, and even more preferably not more than 40% of the surface area of the bottom surface.

Preferably, the protrusions on the bottom surface of the drain cover protrude downwardly from the lower surface of the drain cover about ⅛ to ½ inch, more preferably about ¼ inch.

The protrusions on the bottom surface have a shape that makes the protrusions durable and not easily broken, preferably with rounded edges or a smooth contoured surface. The protrusions preferably have a semi-sphere shape, for example, a half-sphere shape. Preferably, the height of each protrusion is less than or equal to the diameter of each protrusion.

Materials from which the Drain Cover can be Made

The drain cover should be made of a material that is rigid and strong enough to withstand a person stepping on the drain cover, yet flexible enough to conform at least partially to the drain area and to prevent cracking or breaking when stepped on. Preferably, the drain cover has a smooth non-porous surface that does not absorb water and that can be easily swept or cleaned by spraying with a hose. The drain cover is also preferably durable in outdoor conditions of hot and cold weather. The drain cover is preferably made of a material that allows the drain cover to sag at least partially under its own weight and under the weight of debris collected on top of the drain cover or a person walking over the drain cover without cracking or breaking, including when the drain cover is placed on top of a sloped surface, such as a stairwell that is sloped downward towards the drain at the bottom of the stairwell.

The drain cover may be made of any durable material, and especially a rubber or plastic material. Preferable materials are ethylene propylene diene monomer (EPDM) rubber, butyl rubber, nitrile rubber, styrene-butadiene rubber (SBR), vinyl, polyethylene, polyvinyl chloride (PVC), polyurethane, polypropylene, or any material that has one or more of the desired functional features described in this section.

Packaged Drain Cover

The drain cover may be packaged with instructions that the drain cover should be placed over a drain. Preferably, the drain cover packaging is physically associated with the drain cover and contains instructions to place the drain cover over a drain to catch debris while still allowing the passage of water through the drain. The drain cover packaging can include instructions for the drain cover to be placed over a drain with the protrusions facing downward to contact with a surface such as a stairwell. The drain cover packaging can be in the form of hooks, displays, or instruction sheets attached to the drain cover.

Optional Features

In addition to the above-listed characteristics, the drain cover may include screw holes that attach the drain cover to the surface below the drain cover. The present invention may also include an area that allows for a logo to be placed on the top surface of the invention. If a logo is included, holes can be excluded from the portion of the drain cover with the logo.

DETAILED DESCRIPTION OF THE DRAWINGS

Referring now to FIGS. 1-6, the present invention features a drain cover 2 for protecting drains in areaways from getting clogged with leaves, trash and other debris. The drain cover 2 can help prevent flooding and other damage caused by clogged areaway drains.

One embodiment of the drain cover 2 may be circular, as shown in FIG. 1. The circular drain cover 2 shown in FIG. 1 has a diameter 3 of 24". The circular drain cover 2 shown in FIG. 1 also has 334 passages 10 passing through the drain cover 2.

Figure 2:
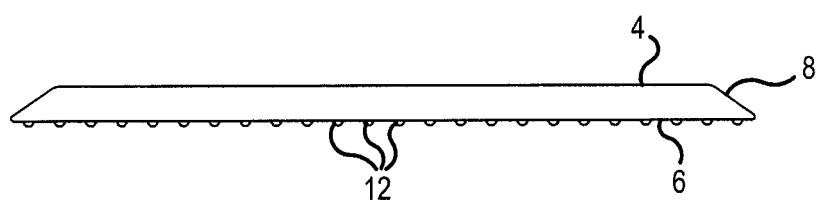
FIG. 2 is a side view of the drain cover.

The drain cover 2 has a top surface 4, a bottom surface 6, and a peripheral edge surface 8. The peripheral edge surface 8 may be angled, as shown in FIG. 2. The bottom surface 6 may have a number of protrusions 12 attached to bottom surface 6.

Figure 3:
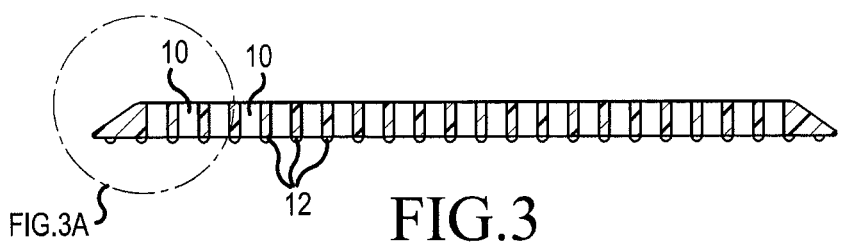
FIG. 3 is a cross-sectional view of the drain cover taken along line 3-3 in FIGS. 1 and 4.
Figure 3A:
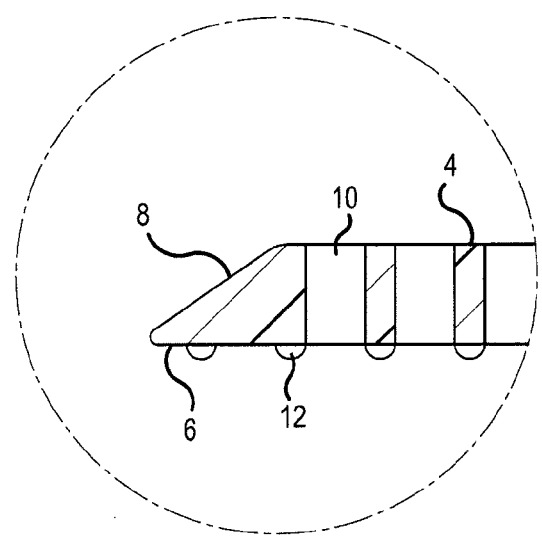
FIG. 3A is an exploded view of a portion of the cross-sectional view of the drain cover shown in FIG. 3.
Figure 4:
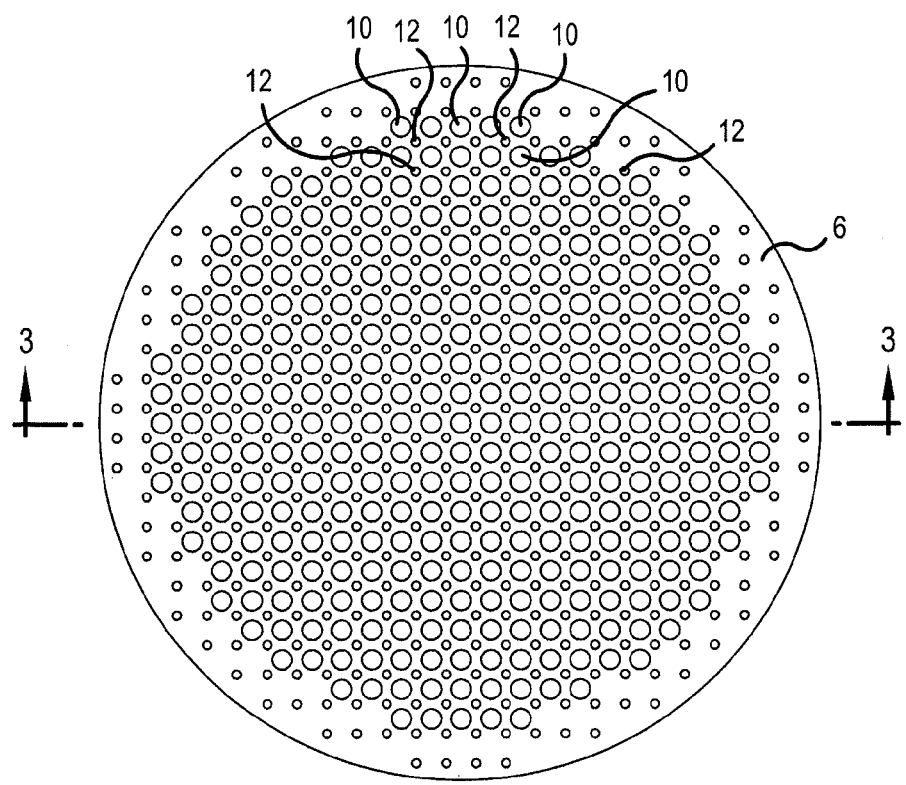
FIG. 4 is a bottom view of the drain cover which shows the spatial relationship between the passages and the protrusions on the bottom surface of the drain cover.

The drain cover 2 may also have a plurality of passages 10 (334), each having a diameter of ½ inch, allowing for water to pass through the drain cover. The drain cover 2 may also have a plurality of semicircular protrusions 12 (having a height of ¼ inch and a diameter of ½ inch) allowing for drainage of water under the drain cover. The protrusions 12 can be spaced equidistant between four passages 10 (see FIGS. 3, 3A and 4). FIG. 4 shows the bottom surface 6 of the drain cover 2. The protrusions 12 (430 in number) may extend close to the outer edge of the bottom surface 6 of the drain cover 2, as shown in FIGS. 2, 3, 3A, 4 and 5. FIG. 3A shows that where the peripheral edge surface 8 connects with the top and bottom surfaces of the drain cover, the edges/connections are preferably rounded.

Figure 5:
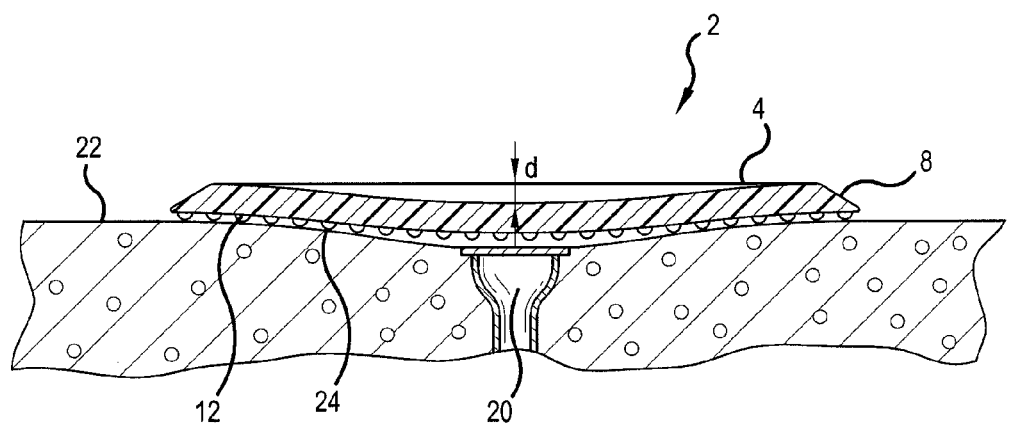
FIG. 5 is a cross-sectional view of the drain cover when placed on an exterior stairwell drain which illustrates how the drain cover sags under its own weight when placed on a typical stairwell in which the concrete base in the stairwell slopes downwardly towards the stairwell drain.

The drain cover 2 can be placed on the upper surface of a stairwell 22 on top of a drain 20 so that one or more of the protrusions 12 are contacting the upper surface of the stairwell 22 at certain contact points 24. As shown in FIG. 5, distance "d" represents the "sag" when the drain cover 2 is placed on a sloped surface, such as the upper surface of a stairwell 22 that slopes toward a drain 20.

Figure 6:
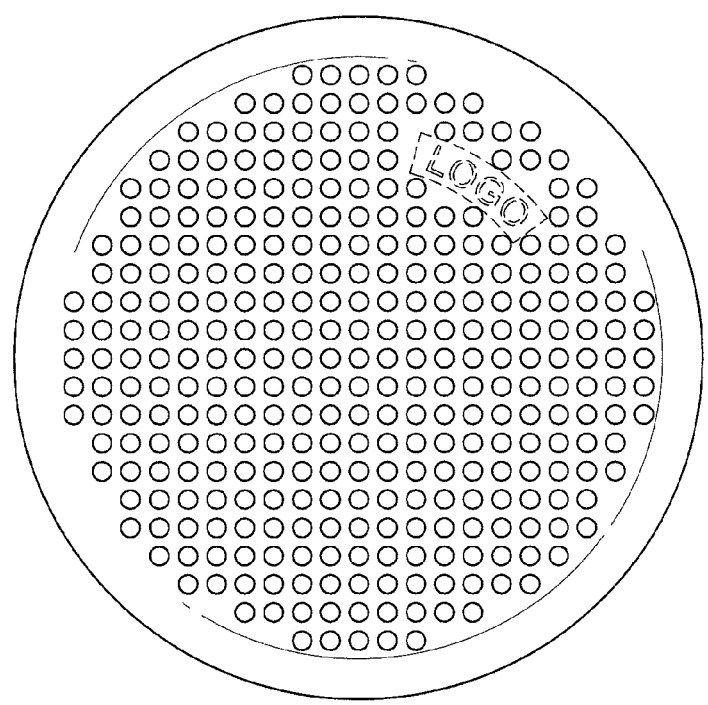
FIG. 6 is a top view of a preferred embodiment of the drain cover with a logo printed on the top edge of the drain cover.

The top surface 4 of the drain cover 2 may optionally contain a logo printed on or embedded into the top surface 4, as shown in FIG. 6. The area with the logo preferably does not contain holes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A single piece molded drain cover having a generally planar top surface having a first surface area, a bottom surface parallel to said top surface having a second surface area which is larger than said first surface area and having a shape the same as said top surface and a peripheral edge surface connecting said top surface with said bottom surface, said drain cover further comprising a plurality of passages passing from said top surface to said bottom surface which allow water to pass through said passages, said lower surface further comprising a plurality of protrusions located inwardly of an outer peripheral edge of the bottom surface, said protrusions projecting downwardly from said bottom surface so that when said drain cover is placed over a drain said protrusions rest on a surface on which said drain cover is resting such that the portion of said bottom surface containing said protrusions is spaced horizontally above said surface so as to allow water to flow through said plurality of passages and then between said protrusions towards said drain.

2. The drain cover according to claim 1, wherein said peripheral edge surface is angled between 30 and 60 degrees relative to horizontal.

3. The drain cover according to claim 1, which has a circular shape when viewed from the top.

4. The drain cover according to claim 3, wherein said drain cover has a diameter of about 18 to 30 inches.

5. The drain cover according to claim 1, wherein said plurality of protrusions protrude downwardly from said lower surface at least 0.25 inch.

6. The drain cover according to claim 1, wherein said drain cover is made from plastic or rubber material that is a non-absorbent, non-porous plastic or rubber material.

7. The drain cover according to claim 1, wherein said material is sufficiently rigid so that when placed on a flat surface said drain cover does not sag between said plurality of protrusions to an extent whereby said drain cover touches the surface on which said drain cover is resting and wherein said material also has flexibility so that said material will deform under its own weight when placed on an uneven surface.

8. The drain cover according to claim 1, wherein said plurality of passages are circular in shape when viewed from the top.

9. The drain cover according to claim 1, wherein said plurality of passages are arranged in a regular pattern over at least 50% of said first surface area of said top surface.

10. The drain cover according to claim 1, wherein said plurality of passages are arranged in a regular pattern over at least 80% of said first surface area of said top surface.

11. The drain cover according to claim 1, wherein said peripheral edge surface is in a shape of a truncated cone.

12. The drain cover according to claim 1, wherein some of said plurality of projections are located on a peripheral area of said bottom surface and inwardly from the outer peripheral edge of said bottom surface, whereby said peripheral edge is spaced horizontally above said surface on which said drain cover is resting so as to allow water to pass under said peripheral edge surface.

13. A packaged drain cover comprising a drain cover described in claim 1 and packaging physically associated with said drain cover with instruction that said drain cover should be placed over a drain.

14. The drain cover according to claim 1, wherein said plurality of protrusions have a smooth contoured surface.

15. The drain cover according to claim 1, wherein the height of each protrusion is less than or equal to the diameter of each protrusion.

16. The drain cover according to claim 1, wherein said drain cover is circular in shape and has a diameter of 12 to 36 inches.

17. The drain cover according to claim 1, wherein each of said protrusions is spaced equidistant from four adjacent passages.

18. A single piece molded drain cover having a generally planar top surface having a first surface area, a bottom surface parallel to said top surface having a second surface area which is larger than said first surface area and having a shape the same as said top surface and a peripheral edge surface connecting said top surface with said bottom surface, said drain cover further comprising a plurality of passages passing from said top surface to said bottom surface which allow water to pass through said passages, said lower surface further comprising a plurality of protrusions projecting downwardly from said bottom surface so that when said drain cover is placed over a drain, the portion of said bottom surface containing said protrusions is spaced horizontally above a surface on which said drain cover is resting so as to allow water to flow through said plurality of passages and then between said protrusions towards said drain, wherein said passages and said protrusions are arranged in a regular pattern and there is a 1:1 correspondence between the number of passages and the number of protrusions throughout said bottom surface of said drain cover except that there are additional protrusions on said bottom surface of said drain cover around a peripheral portion of said bottom surface of said drain cover.

19. A method for reducing the clogging of a stairwell drain by leaves, comprising the step of:

placing over a stairwell drain a single piece molded drain cover to reduce clogging in an exterior stairwell having a top surface, a bottom surface parallel to said top surface and a peripheral edge surface, said drain cover further comprising a plurality of passages passing from said top surface to said bottom surface for allowing water to pass through said passages, said lower surface further comprising a plurality of protrusions located inwardly of an outer peripheral edge of the bottom surface, said protrusions projecting downwardly from said bottom surface so that when said drain cover is placed over a drain said protrusions rest on a surface on which said drain cover is resting such that the portion of said bottom surface containing said protrusions is spaced horizontally above said surface so as to allow water to flow through said plurality of passages and then between said protrusions towards said drain.

20. In combination, an exterior stairwell drain and a single piece molded drain cover placed over said stairwell drain, said plastic drain cover having a top surface, a bottom surface parallel to said top surface and a peripheral edge surface, said drain cover further comprising a plurality of passages passing from said top surface to said bottom surface for allowing water to pass through said passages, said lower surface further comprising a plurality of protrusions located inwardly of an outer peripheral edge of the bottom surface, said protrusions projecting downwardly from said bottom surface so that when said drain cover is placed over said drain said protrusions rest on a surface on which said drain cover is resting such that the portion of said bottom surface containing said protrusions is spaced horizontally above said surface so as to allow water to flow through said plurality of passages and then between said protrusions towards said drain.

* * * * *